United States Patent
Ami et al.

(10) Patent No.: US 6,251,360 B1
(45) Date of Patent: *Jun. 26, 2001

(54) METHOD OF PRODUCING BISMUTH LAYERED COMPOUND

(75) Inventors: Takaaki Ami; Katsuyuki Hironaka, both of Kanagawa; Chiharu Isobe, Tokyo; Yuji Ikeda, Kanagawa, all of (JP)

(73) Assignee: Sony Corporation, Tokyo (JP)

( * ) Notice: Subject to any disclaimer, the term of this patent is extended or adjusted under 35 U.S.C. 154(b) by 0 days.

This patent is subject to a terminal disclaimer.

(21) Appl. No.: 09/369,867

(22) Filed: Aug. 9, 1999

Related U.S. Application Data (63) Continuation of application No. 08/621,618, filed on Mar. 26, 1996, now Pat. No. 5,935,549.

(30) Foreign Application Priority Data

Mar. 30, 1995 (JP) .................................................. 7-073882

(51) Int. Cl.$^7$ .......................... C01G 29/00; C01G 35/00; C01F 11/00; B05D 5/00; C23C 16/00
(52) U.S. Cl. .................. 423/593; 423/126.3; 423/255.32
(58) Field of Search ............................... 423/593, 87, 62, 423/155; 427/126.3, 255.32

(56) References Cited

U.S. PATENT DOCUMENTS

| | | | |
|---|---|---|---|
| 5,478,610 | * 12/1995 | Desu et al. | 427/255.32 |
| 5,629,267 | * 5/1997 | Ikegawa et al. | 505/238 |
| 5,648,114 | * 7/1997 | Paz De Araujo et al. | 427/126.3 |
| 5,935,549 | * 8/1999 | Ami et al. | 423/593 |
| 5,976,624 | * 11/1999 | Ami et al. | 427/255.32 |

OTHER PUBLICATIONS

Atsuki, et al., "Preparation of Bi–Based Ferroelectric Thin Films by Sol–Gel Method" Jpn. J. Appl. Phys. vol. 34, pp.5096–9, Sep. 1995.*

* cited by examiner

*Primary Examiner*—Steven Bos
(74) *Attorney, Agent, or Firm*—Sonnenschein, Nath & Rosenthal (57) ABSTRACT

A method of producing a bismuth layered compound that includes the steps of providing a substrate, dissolving Bi, Sr and Ta containing compounds in an organic solvent to form a solution having a Bi:Sr:Ta volume ratio of 2:1:2, evaporating the solution and depositing the evaporated solution onto the substrate, heating the substrate to form a thin film having a fluorite structure, and heating the thin film in an oxidizing atmosphere to convert the thin film having a fluorite structure to a thin film comprising $Bi_2SrTa_2O_9$.

19 Claims, 6 Drawing Sheets

FIG. 1

● B (metal)   ○ O

METHOD OF PRODUCING BISMUTH LAYERED COMPOUND

This is a continuation of application Ser. No. 08/621,618, filed Mar. 26, 1996, now U.S. Pat. No. 5,935,549.

BACKGROUND OF THE INVENTION

1. Field of the Invention

The present invention relates to a method of producing a bismuth layered compound for use in an electronic device such as a ferroelectric memory, for example.

2. Description of the Related Art

Bismuth layered compounds including bismuth superconducting oxides having a critical temperature of 110 K and ferroelectric memory materials play a very important role in industrial applications. For applying such bismuth layered compounds to electronic devices, it is necessary to develop a thin-film fabrication process for those bismuth layered compounds.

The structure of a bismuth layered compound, e.g., $Bi_2PbNb_2O_9$, is of a pseudo tetragonal system having a columnar shape extending in the direction of a c-axis. It has a repetitive structure comprising layers of a bismuth oxide and oxides of other elements which are laminated in a certain sequence (see G. A. SMOLENSKII et al., SOVIET PHYSICS—SOLID STATE, p. 651–655 (1961) and E. C. SUBBARAO, J. Phys. Chem. Solids Pergamon Press. Vol. 23, p. 665–676 (1972)).

In the repetitive structure, the number of bismuth oxide layers in one unit structure and the length of the unit structure vary from bismuth layered compound to bismuth layered compound.

Attempts to apply such bismuth layered compounds to electronic devices have been made in the art. According to one of the efforts, a thin film of a bismuth layered compound which exhibits good ferroelectric properties is produced by a spin coating process such as a MOD (Metal Organic Deposition) process.

However, the spin coating process fails to meet requirements for clean environments that are to be established in the actual semiconductor fabrication process.

For the above reasons, there has been a need for a new thin-film fabrication process for manufacturing a thin film of a bismuth layered compound. To make a thin film of an oxide, however, it is difficult to rely on oxidization carried out by an ultrahigh vacuum process such as molecular beam epitaxy or laser ablation. The application of the MOCVD (Metal Organic Chemical Vapor Deposition) process which is widely used for semiconductor fabrication has encountered obstacles because a hydrogen gas cannot be used as a carrier and a good source material is not available.

SUMMARY OF THE INVENTION

It is therefore an object of the present invention to provide a method of producing a bismuth layered compound which has good crystalline properties and good electric properties.

According to the present invention, there is provided a method of producing a bismuth layered compound comprising the step of heating a compound of fluorite structure as a precursor into a bismuth layered compound.

The bismuth layered compound thus produced has good crystalline properties and good electric properties.

Specifically, a compound of fluorite structure as a precursor is produced by a deposition process, and the precursor is heated by a oxidizing and crystallizing process, i.e., a hot annealing process, in an oxidizing atmosphere.

DETAILED DESCRIPTION OF THE PREFERRED EMBODIMENTS

According to the present invention, a compound of fluorite structure is produced as a precursor, and the precursor is then heated into a desired bismuth layered compound.

The fluorite structure which is contained as a basic structure in various fluorite minerals has long been known as a crystalline structure of fluorspar ($CaF_2$). The crystalline structure of fluorspar is of a cubic system, and contains calcium atoms positioned at tetrahedral sites and fluorine atoms at cubic sites.

The fluorite structure is found in not only fluorspar, but also many fluorides ($MF_2$) and oxides ($MO_2$) of various elements including Ce (cerium), Pr (praseodymium), Tb (terbium), and actinoids (Th (thorium)–Am (americium)).

Because these compounds are nonstoichiometric compounds, they are tolerant of large compositional changes at the sites of both metal and anion (F or O) elements.

For example, $ZrO_2$ (zirconium oxide) allows a large amount of alkaline earth metal or another element to be contained as a solid solution, and uranium oxide can be a nonstoichiometric compound with excessive oxygen.

Figure 1:
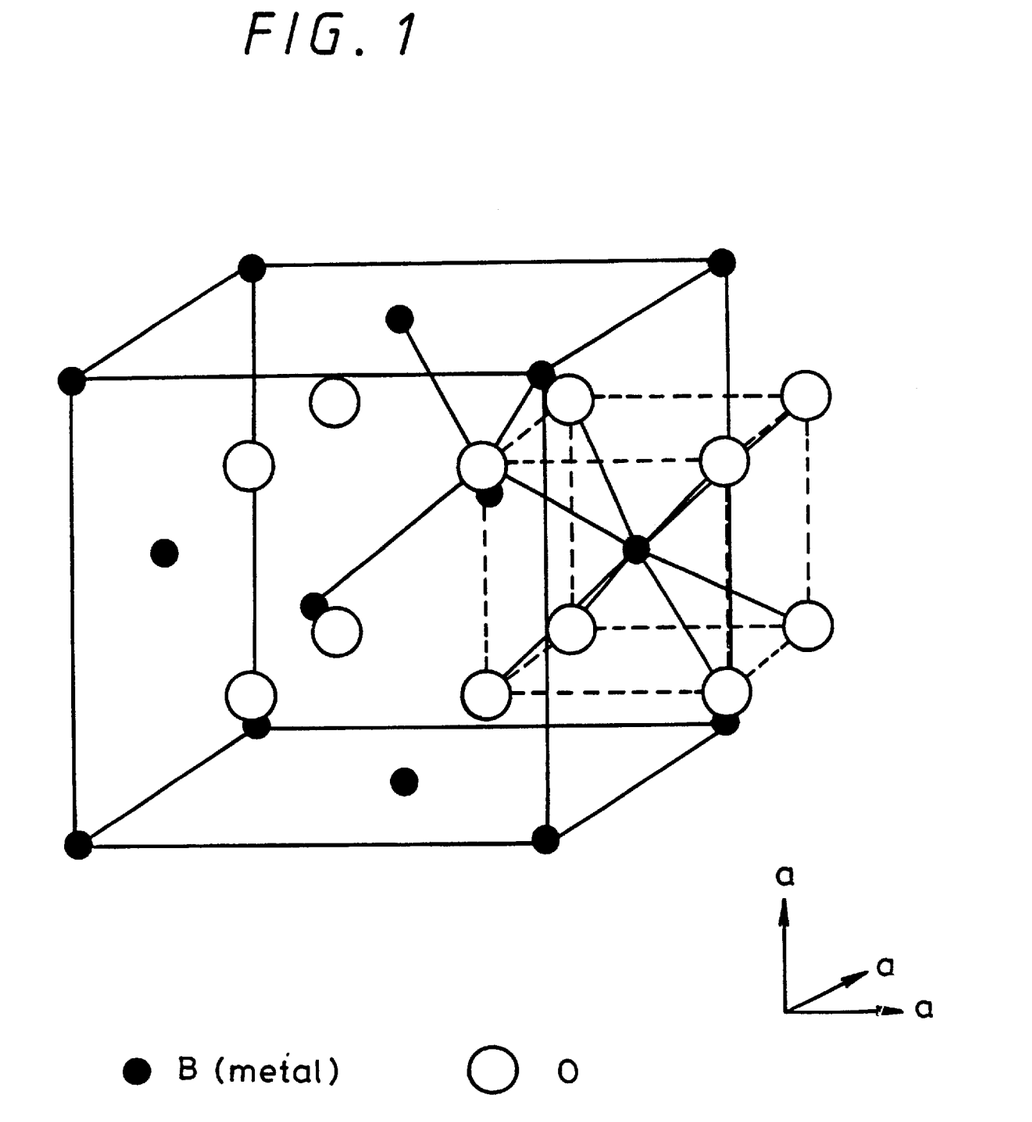
FIG. 1 is a schematic perspective view of the crystalline structure of a metal oxide of fluorite structure.

The fluorite structure of the above oxides is of a cubic system and has high spatial symmetry, as with fluorspar, with metal atoms positioned at the sites of calcium atoms of fluorspar and oxygen atoms at the sites of fluorine atoms of fluorspar. The crystalline structure of an oxide ($BO_2$) of fluorite structure is shown in FIG. 1. As shown in FIG. 1, metal atoms (B) are of a face-centered cubic lattice whereas oxygen atoms (O) are of a unit cubic lattice. It can also be seen that a metal atom (B) is positioned at the center of a cube composed of oxygen atoms (O), and an oxygen atom (O) is positioned at the center of a regular tetrahedron composed of metal atoms (B).

The fluorite structure of a bismuth compound, which is a precursor according to the present invention, is basically of the crystalline structure shown in FIG. 1, and contains bismuth and other metal atoms placed at the sites of B and oxygen atoms placed at the sites of oxygen atoms.

Due to the above compositional changes, the fluorite structure of the precursor actually has its symmetry slightly poorer than the cubic system of a pure fluorite structure, and may be of a tetragonal system, a rhombic system, or a monoclinic system, or of a structure slightly changed from a fluorite structure.

Various existing film fabrication processes may be used to form a compound, especially a thin film thereof, having a fluorite structure which will serve as a precursor.

These film fabrication processes include a sol-gel process, a spin coating process such as a MOD process, an LSMCD (Liquid Source Misted Chemical Deposition) process, a CVD (Chemical vapor Deposition) process using a metal halide, a MOCVD (Metal Organic Chemical Vapor Deposition) process using DPM (DiPivaloylMethanato) or the like as a source, a flash CVD process in which a source is carried and mixed in a liquid phase and evaporated by rapid depressurization in a reactive chamber, and physical evaporation processes including a vacuum evaporation process, a molecular beam evaporation process, a laser ablation process, and a sputtering process, etc.

According to the spin coating process, for example, a compound of fluorite structure can be produced at about 800° C. According to the CVD process, a compound of fluorite structure can be produced at a lower temperature of at most 600° C.

In a method of producing a bismuth layered compound according to the present invention, a thin film as a precursor has a composition which is the same as or close to a bismuth layered compound desired to be produced.

The bismuth layered compound desired to be produced may be, for example, $Bi_2(Sr,Ba,Ca)(Ta,Nb)_2O_9$ which is used as a ferroelectric material, or a Bi oxide superconducting material, or the like.

The thin film of a compound of fluorite structure which serves as a precursor is grown preferably under the following conditions:

Reaction temperature: 400~700° C.;

Reaction gas pressure: 0.1~50 torr;

Carrier gas: an oxidizing gas containing at least 5% of oxygen.

The thin film of a compound of fluorite structure which serves as a precursor is annealed preferably under the following conditions:

Annealing temperature: ranging from the film growth temperature inclusive to 850° C. inclusive;

Atmosphere: oxidizing atmosphere.

The desired bismuth layered compound can be produced under the above conditions.

The growth of a thin film of a bismuth layered compound whose composition is $Bi_2SrTa_2O_9$ will be described below.

If the flash CVD process is used, among other processes described above, then it is possible to synthesize a precursor of fluorite structure which is grown as deposited, rather than being annealed. The growth of a thin film of a bismuth layered compound according to the flash CVD process will be described below.

A substrate of silicon with layers of Ti, Pt deposited successively thereon by sputtering is used.

CVD sources may be a Bi source of $BiPh_3$ (triphenyl bismuth), $Bi(O-Tol)_3$, or the like, an Sr source of $Sr(DPM)_2$ (dipivaloyl strontium), $Sr(Me_5C_5)_2 \cdot 2THF$, or the like, and a Ta source of $Ta(OCH_3)_5$, $Ta(O-iPr)_5$, or the like.

If the Bi source is of a material containing oxygen, such as $Bi(O-iPr)_5$, $Bi(O-tC_4H_9)_3$, $Bi(O-tC_5H_{11})_3$, $Bi(O-Tol)_3$, or the like, then a compound of fluorite structure may be produced even in the absence of the oxidizing atmosphere.

The above source materials are dissolved in an organic solvent or the like, and carried in a liquid phase, together with an Ar (argon) carrier gas, into a reactor. The reactor is rapidly depressurized preferably to 0.1~10 torr to evaporate the source solution, thus depositing the source material in a gas phase on the substrate. If pure oxygen is used as an oxidizing gas, then it is supplied at a rate adjusted such that the partial pressure of oxygen is about 50% of the total pressure.

The source materials are mixed at a ratio which is established properly preferably by analyzing the composition of a thin film produced on a trial basis by EPMA (Electron Probe Microanalyzer) or an X-ray fluorescence spectroscopy, comparing the analyzed composition with a desired composition, and adjusting the proportions of the source materials.

If the source materials are supplied at a correct composition ratio, then it is possible to obtain a thin film of fluorite structure in a single phase or an almost single phase at a substrate temperature ranging from 400 to 700° C.

The precursor thus produced is heated preferably at 800° C. for one hour in an oxidizing atmosphere, preferably in a flow of oxygen under normal pressure, thereby producing a thin film which comprises a main phase of a bismuth layered compound of $Bi_2SrTa_2O_9$.

If electrodes of platinum are formed on the thin film by sputtering, then it is possible to measure the thin film for electric properties, and observe a clear hysteresis curve thereof.

Substances produced by the CVD process are generally diverse because of complex multistage reactions between the source materials, and subject to compositional changes due to nucleation in a gas phase, the generation of byproducts, and re-evaporation from the substance, for example. For this reason, it is difficult to obtain a thin film in a desired phase as deposited, and impossible to obtain a compound in a desired phase when the thin film thus obtained is annealed.

The method according to the present invention is effective to produce a bismuth layered compound in a desired phase by heating a precursor of fluorite structure as a crystal nucleus.

Bismuth oxides often exhibit optimum electric properties even though their compositions are slightly different from the theoretical composition. Actually, the thin film of a bismuth layered compound according to the present invention contains a somewhat excessive amount of bismuth.

The compound of fluorite structure as a precursor may be of a cubic system or a tetragonal system, a rhombic system, or a monoclinic system which contains slight asymmetries.

A specific example of the method of producing a bismuth layered compound according to the present invention will be described below. In this example, a thin film of a bismuth layered compound whose composition is $Bi_2SrTa_2O_9$ was fabricated.

Layers of Ti and Pt were successively deposited, each to a thickness of 100 nm, on the (100) face of naturally oxidized silicon at room temperature by sputtering, thus producing a substrate.

Source materials for use in the CVD process were selected to be $BiPh_3$, $Sr(DPM)_2$, and $Ta(O-iPr)_5$, and dissolved in an organic solvent of THF (tetrahydrofuran) or the like, producing respective solutions each having a concentration of about 0.1 M/l.

The solutions were mixed together at an initial liquid volume ratio of Bi:Sr:Ta=2:1:2, and then carried into an evaporator. The evaporator had been heated so that the source materials would not be separated and attached to the inner wall surface of the evaporator.

The solution that was evaporated by the evaporator is introduced from the evaporator, together with a carrier gas of Ar, into a reactor.

The evaporator and the reactor were depressurized to about 10 torr to evaporate the source solution. The evaporated source solution was then carried in a gas phase and deposited on the substrate while the substrate was kept at a temperature of about 600° C.

An oxidizing gas, such for example as pure oxygen, a balancing gas of a mixture of Ar and 20% of oxygen, ozone, $N_2O$, $NO_2$, or the like was introduced directly into the reactor, not through the evaporator.

The carrier gas of Ar and the oxidizing gas were supplied at a rate which was adjusted to about 500 sccm by respective mass flow controllers.

In this manner, a thin film of fluorite structure in an almost single phase, which had excellent crystalline properties, was obtained.

Figure 2:
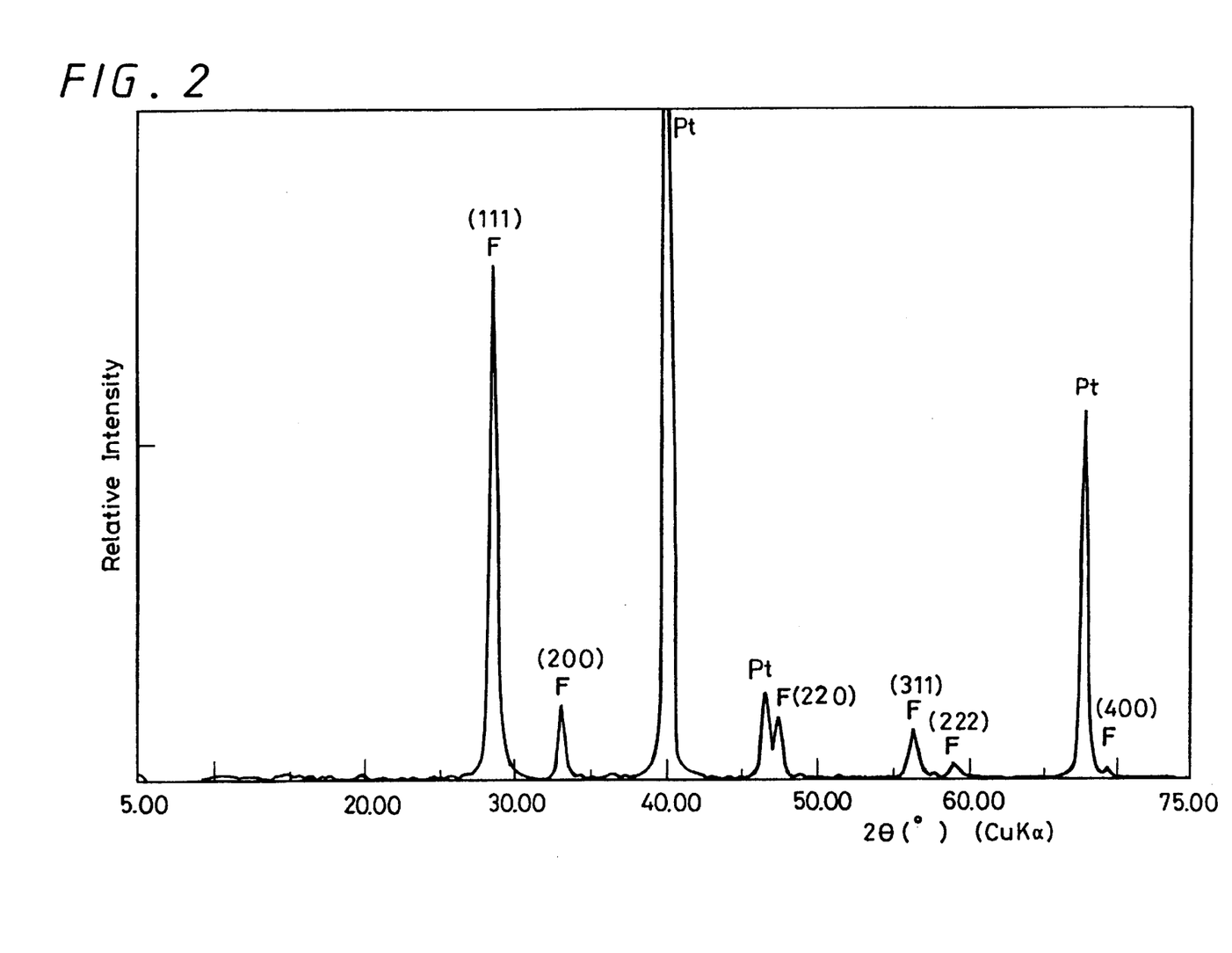
FIG. 2 is a diagram showing an X-ray diffraction pattern of a thin film of a compound of fluorite structure according to the present invention.
Figure 3:
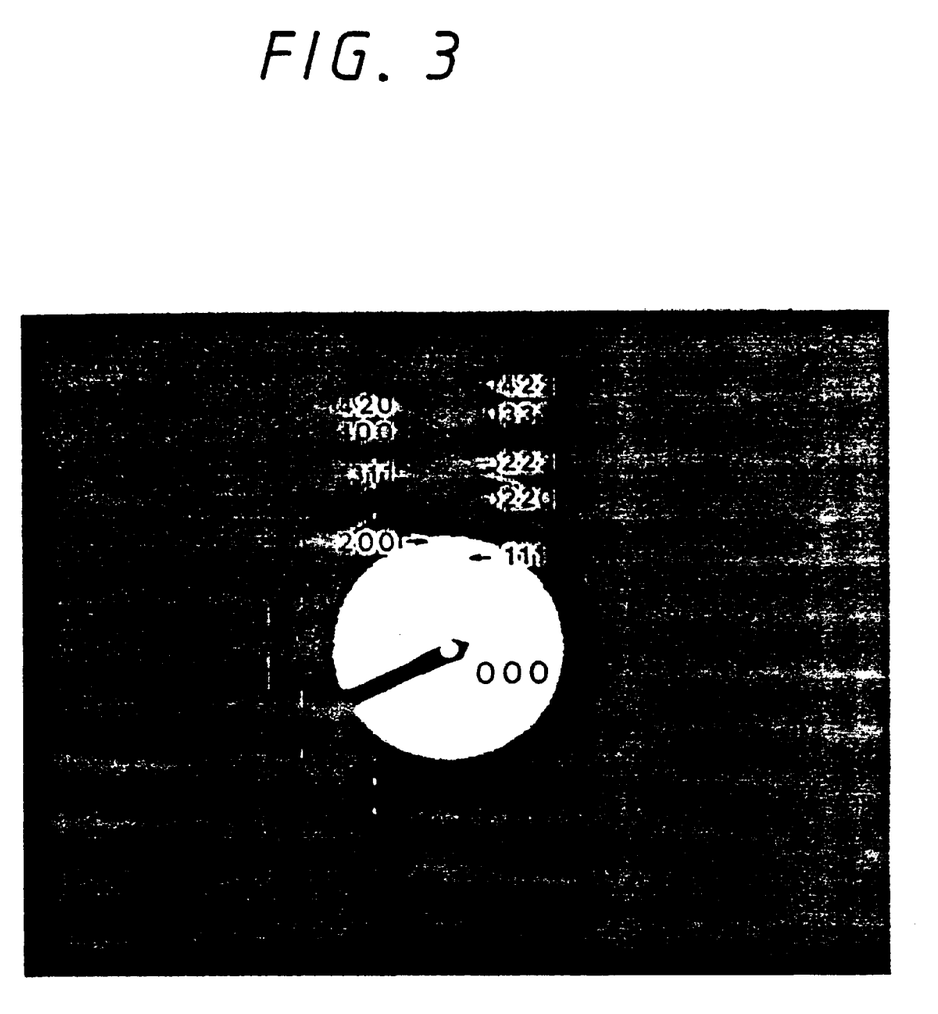
FIG. 3 is a diagram of an electron diffraction image of the thin film of the compound of fluorite structure according to the present invention.

The thin film thus produced had an X-ray diffraction pattern as shown in FIG. 2, and an electron diffraction image as shown in FIG. 3.

Peaks indicated by F in FIG. 2 represent a bismuth compound of fluorite structure, and peaks indicated by Pt in FIG. 2 represent Pt in the substrate beneath the thin film. The numerals associated with the peaks F represent crystal faces corresponding to the peaks.

In FIGS. 2 and 3, the peaks and the diffraction image are observed which are reflected by the (111), (200), (220), (311), (222), (400), (331), (420), (422) faces, well indicating the features of a fluorite structure.

The thin film made of the compound of fluorite structure was heated at 800° C. for one hour in a flow of oxygen under normal pressure.

As a result, there was produced a thin film of a bismuth layered compound which had a composition of $Bi_2SrTa_2O_9$ as a main phase.

Figure 4:
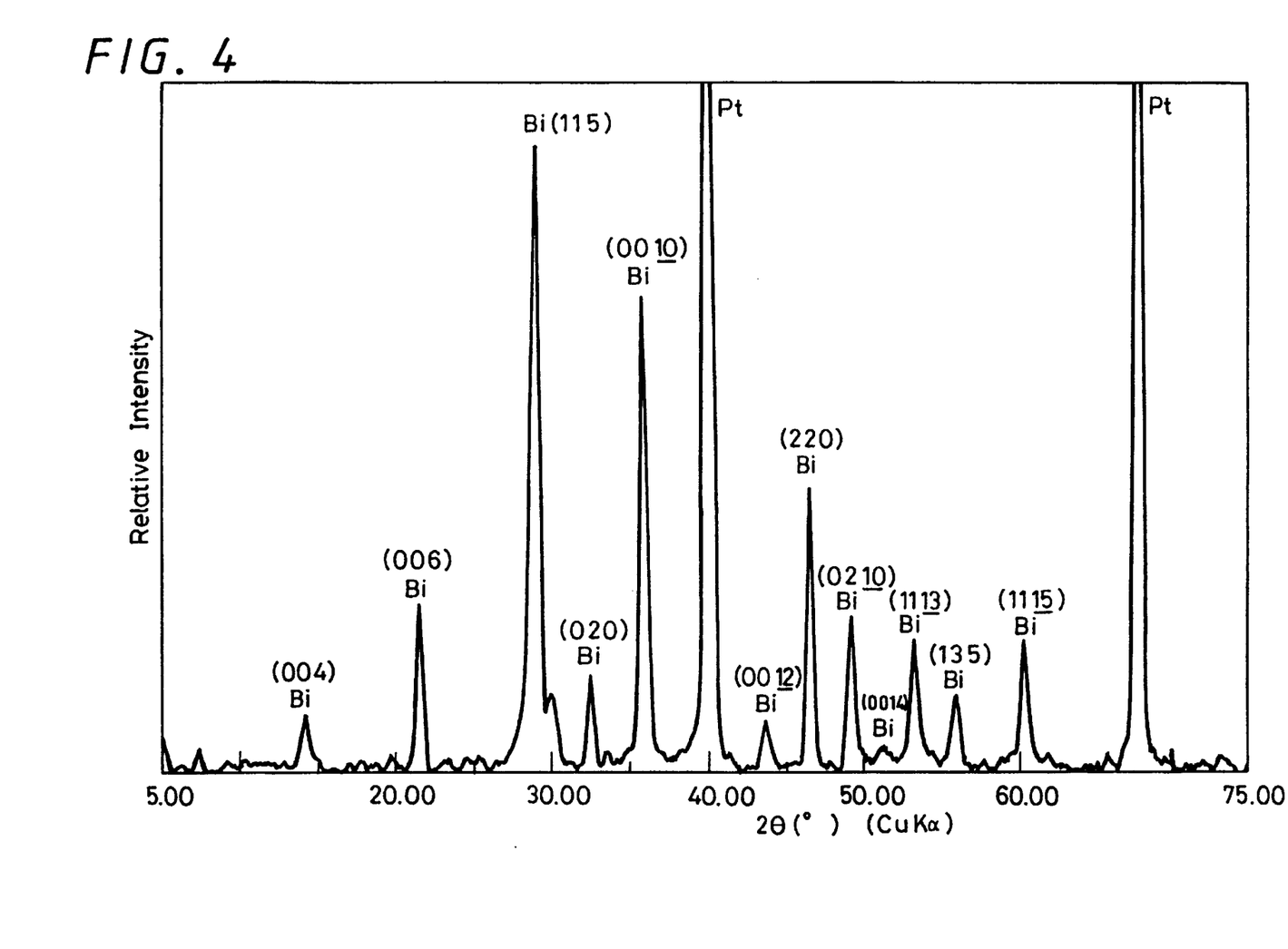
FIG. 4 is a diagram showing an X-ray diffraction pattern of a bismuth layered compound which is produced by annealing.

An X-ray diffraction pattern of the thin film of the bismuth layered compound is shown in FIG. 4.

In FIG. 4, Pt indicates peaks representing platinum, and Bi indicates peaks represents the bismuth layered compound.

A comparison between the X-ray diffraction patterns shown in FIGS. 2 and 4 revealed that a phase change occurred due to annealing in the oxidizing atmosphere, changing the positions of the peaks, i.e., the crystalline structure of the bismuth layered compound. The observed diffraction image in a limited field of view of the bismuth layered compound was in good conformity with calculated results, and confirmed that the bismuth layered compound of good crystalline structure was obtained.

For evaluating the characteristics of the thin film fabricated in the above example, upper electrodes of platinum having a thickness of about 200 nm were formed on the thin film by sputtering, and the thin film was measured for hysteresis.

Figure 5:
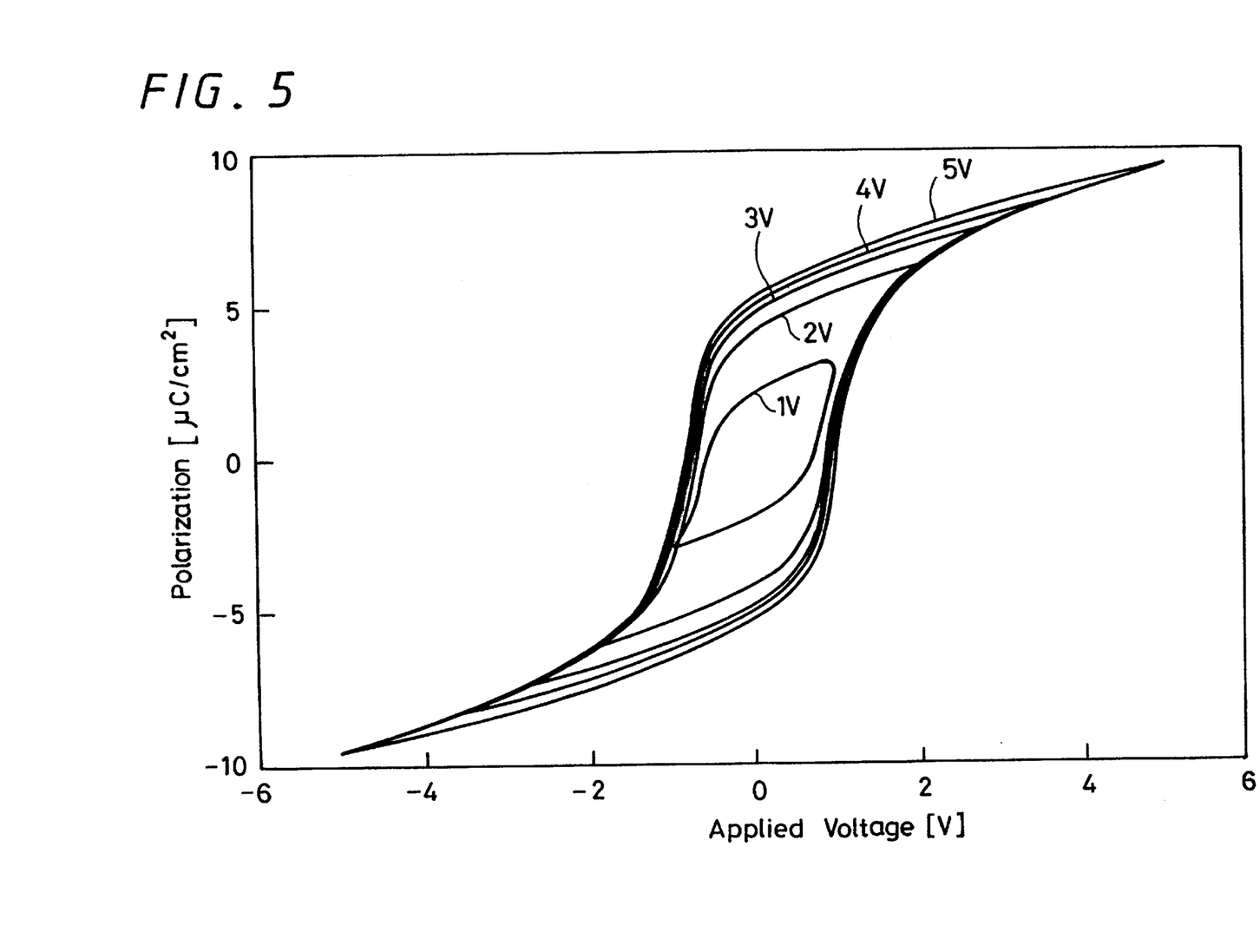
FIG. 5 is a diagram of a hysteresis curve of the bismuth layered compound.

FIG. 5 shows a hysteresis curve of the measured thin film. The hysteresis curve was plotted while the applied voltage was being changed from 1 to 5 V. When the applied voltage was 3 V or higher, a 2 Pr value (which is the difference between a positive remanent polarization $Pr^+$ and a negative remanent polarization $Pr^-$) representing a polarization is of about 10 $\mu C/cm^2$.

Figure 6:
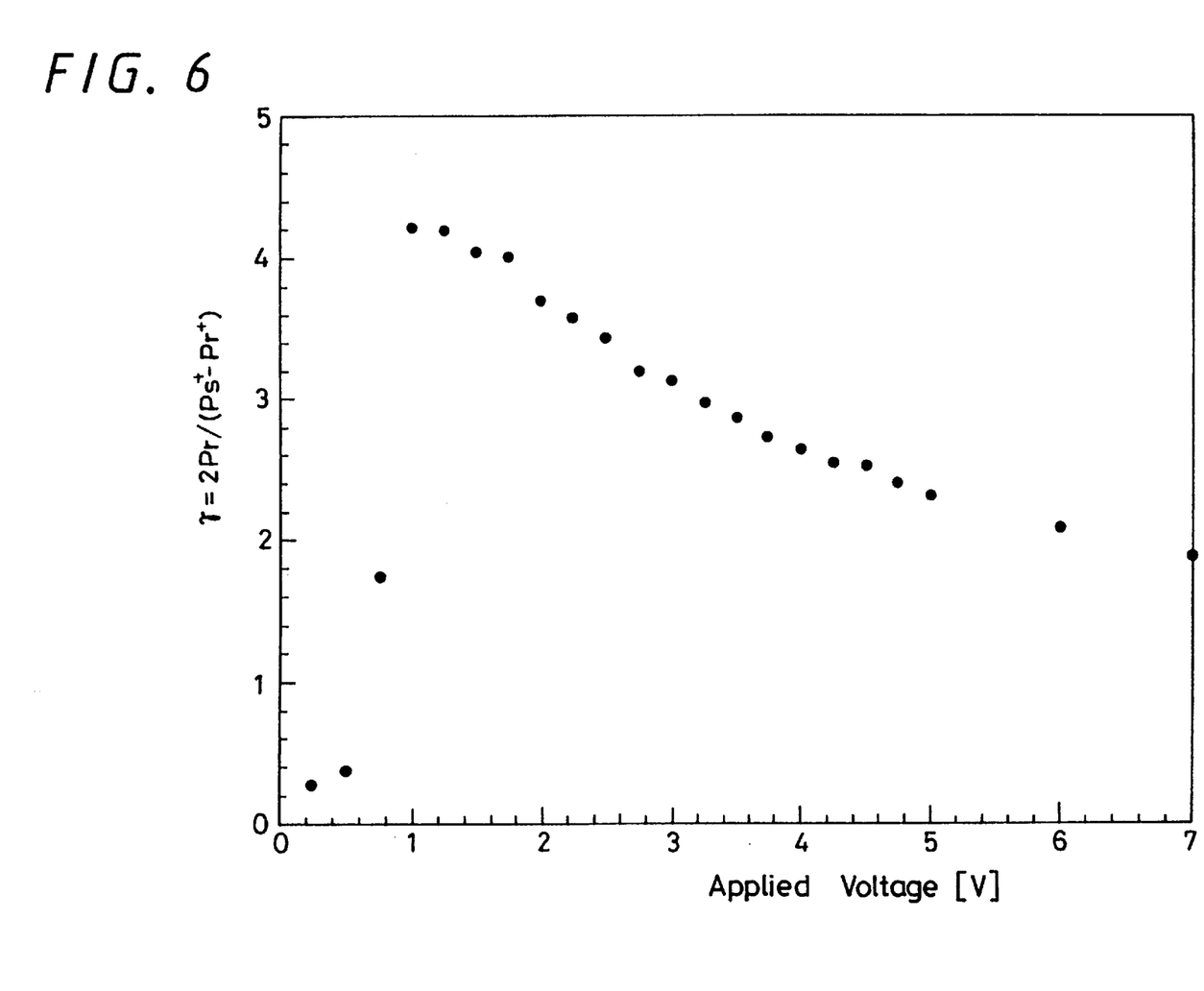
FIG. 6 is a graph showing the relationship between applied voltages and y values in the process of plotting the hysteresis curve shown in FIG. 5.

FIG. 6 shows the relationship between the magnitudes of the applied voltages and the values of $\gamma = 2\ Pr/(Ps^+ - Pr^+)$ in the process of plotting the hysteresis curve shown in FIG. 5. $Ps^+$ represents the polarization at the maximum applied voltage. From the viewpoint of the hysteresis curve, the thin film can produce a greater output as the value of $\gamma$ is larger. It can be seen from FIG. 6 that the thin film should preferably be used in combination with an applied voltage of about 1 V.

The position of the value of $\gamma$, i.e., the operating voltage, can be controlled by the thickness of the thin film. The effective output of an actual device greatly depends on the operating voltage, the bit line capacity, etc.

In the above embodiment, the desired bismuth layered compound has a composition of $Bi_2SrTa_2O_9$. However, thin films of desired compositions may be produced for forming bismuth layered compounds of desired compositions.

While the fabrication of a thin film of a bismuth layered compound has been described above in the illustrated embodiment, a bulk bismuth layered compound may also be fabricated by the method according to the present invention. A process of fabricating such a bulk bismuth layered compound will be described below.

Bismuth oxide ($Bi_2O_3$), strontium hydroxide ($Sr(OH)_2$) or strontium nitrate ($Sr(NO_3)_2$), and tantalum oxide ($Ta_2O_5$) are weighed to achieve the composition ratio of a desired bismuth layered compound, sufficiently mixed together, and ground in a mortar into a powdery material.

The strontium material is in the form of a hydroxide or nitrate which can be decomposed at a relatively low temperature, rather than a carbonate which is usually used.

The powdery material is then shaped into a pellet under pressure, and the pellet is kept at 700° C. in the atmosphere for three days.

After the pellet is then heated in a furnace, it is quickly removed from the furnace, and charged into liquid nitrogen by which it is quenched.

In this manner, a bismuth strontium tantalum oxide of fluorite structure which is represented by:

$$(Bi, Sr, Ta)O_{2 \pm \delta}$$

is obtained.

The bismuth strontium tantalum oxide of fluorite structure is heated as a precursor to 800~1000° C. in a flow of oxygen under normal pressure, thereby producing a bismuth layered compound which is of an almost single phase.

With the method according to the present invention, a compound of fluorite structure as a precursor is heated in an oxidizing atmosphere to produce a bismuth layered compound having good electric properties which cannot easily be directly produced by the conventional process.

Since the fluorite structure is tolerant of large compositional changes and bismuth layered compounds exhibit optimum electric properties even though their compositions are slightly different from the theoretical composition, it is possible to produce a bismuth layered compound of such a composition as to exhibit optimum electric properties through the fabrication of a precursor comprising a compound of fluorite structure.

Therefore, it is possible to fabricate from the bismuth layered compound thus produced a ferroelectric thin film having good electric properties.

Because of the large tolerance with respect to compositional changes, process margins, i.e., margins for fabricating conditions, can be relatively large for allowing electronic devices to be manufactured easily from the bismuth layered compound.

Having described preferred embodiments of the invention with reference to the accompanying drawings, it is to be understood that the invention is not limited to those precise embodiments and that various changes and modifications could be effected by one skilled in the art without departing from the spirit or scope of the invention as defined in the appended claims.

What is claimed is:

1. A method of producing a bismuth layered compound consisting essentially of the following steps:

providing a substrate;

dissolving Bi, Sr and Ta containing compounds in an organic solvent to form a solution having a Bi:Sr:Ta volume ratio of 2:1:2;

evaporating the solution and depositing the evaporated solution onto the substrate;

heating the substrate to form a thin film having a fluorite structure;

heating the thin film in an oxidizing atmosphere to convert the thin film having a fluorite structure to a thin film comprising $Bi_2SrTa_2O_9$.

2. The method of claim 1 wherein the substrate comprises a Si layer and layers of Ti and Pt deposited successively on the Si layer.

3. The method of claim 1 wherein the Bi containing compound is selected from the group consisting of triphenylbismuth, $Bi(O-Tol)_3$, $Bi(O-iPr)_5$, $Bi(O-tC_4H_9)_3$, $Bi(O-tC_5H_{11})_3$, and $Bi(O-Tol)_3$ and when the Bi compound is $BiPh_3$, the step of heating the substrate further comprises exposing the substrate to an oxidizing gas.

4. The method of claim 1 wherein the Sr containing compound is selected from the group consisting of $Sr(DPM)_2$ and $Sr(Me_5C_5)_2 \cdot 2THF$.

5. The method of claim 1 wherein the Ta containing compound is selected from the group consisting of $Ta(O-iPr)_5$ and $Ta(OCH_3)_5$.

6. The method of claim 1 wherein the solvent comprises tetrahydrofuran.

7. The method of claim 1 wherein the step of heating the substrate to form a thin film having a fluorite structure further comprises heating the substrate to a temperature of ranging from 400° C. to 700° C.

8. The method of claim 1 wherein the step of heating the thin film in an oxidizing atmosphere to convert the thin film having a fluorite structure to a thin film comprising $Bi_2SrTa_2O_9$ further comprises heating the substrate to a temperature of 800° C.

9. A method of producing a bismuth layered compound consisting essentially of the following steps:

providing a substrate;

dissolving Bi, Sr and Ta containing compounds in an organic solvent to form a solution having a Bi:Sr:Ta volume ratio of 2:1:2;

evaporating the solution and depositing the evaporated solution onto the substrate;

heating the substrate to a temperature ranging from 400° C. to 700° C. and exposing the substrate and evaporated solution to an oxidizing gas to form a thin film having a fluorite structure;

heating the thin film in an oxidizing atmosphere to convert the thin film having a fluorite structure to a thin film comprising $Bi_2SrTa_2O_9$.

10. The method of claim 9 wherein the substrate comprises a Si layer and layers of Ti and Pt deposited successively on the Si layer.

11. The method of claim 9 wherein the Bi containing compound is triphenylbismuth.

12. The method of claim 11 wherein the Sr containing compound is $Sr(DPM)_2$.

13. The method of claim 12 wherein the Ta containing compound is $Ta(O-iPr)_5$.

14. The method of claim 13 wherein the solvent comprises tetrahydrofuran.

15. The method of claim 9 wherein the step of heating the substrate to form a thin film having a fluorite structure further comprises heating the substrate to a temperature of about 600° C.

16. A method of producing a bismuth layered compound consisting essentially of the following steps:

providing a substrate comprising a Si layer and layers of Ti and Pt deposited successively on the Si layer;

dissolving Bi, Sr and Ta containing compounds in an organic solvent to form a solution having a Bi:Sr:Ta volume ratio of 2:1:2;

evaporating the solution and depositing the evaporated solution onto the substrate;

heating the evaporated solution to a temperature of 600° C. and exposing the substrate and evaporated solution to an oxidizing gas to form a thin film having a fluorite structure; and heating the thin film in an oxidizing atmosphere to a temperature of 800° C. to convert the thin film having a fluorite structure to a thin film comprising $Bi_2SrTa_2O_9$.

17. The method of claim 16 wherein the Bi containing compound is triphenylbismuth.

18. The method of claim 17 wherein t Sr containing compound is $Sr(DPM)_2$.

19. The method of claim 18 wherein the Ta containing compound is $Ta(O-iPr)_5$.

* * * * *